United States Patent [19]

Jefferts et al.

[11] 4,233,964
[45] Nov. 18, 1980

[54] INTERNALLY READABLE IDENTIFYING TAG

[76] Inventors: Keith B. Jefferts; Elaine R. Jefferts, both of P.O. Box 425, Shaw Island, Wash. 98286

[21] Appl. No.: 905,540

[22] Filed: May 12, 1978

Related U.S. Application Data

[63] Continuation-in-part of Ser. No. 845,944, Oct. 27, 1977, abandoned, which is a continuation of Ser. No. 671,530, Mar. 29, 1976, abandoned.

[51] Int. Cl.³ .............................................. G09F 3/00
[52] U.S. Cl. ...................................... 128/1 R; 119/3; 128/217; 128/330; 40/2 A
[58] Field of Search ................. 128/330, 217, 1 R; 119/3; 251/324; 40/2 A; 70/460; D8/347, 391

[56] References Cited

U.S. PATENT DOCUMENTS

| | | | |
|---|---|---|---|
| D. 95,077 | 4/1935 | Schlage | D8/347 |
| 1,275,669 | 8/1918 | Forbes | 250/312 |
| 1,432,720 | 10/1922 | Mosely | 70/460 |
| 2,763,027 | 9/1956 | Tampke | 70/460 |
| 3,128,744 | 4/1964 | Jefferts et al. | 119/3 |
| 3,221,932 | 12/1965 | Anderson | 251/324 X |
| 3,231,236 | 1/1966 | Hodel et al. | 251/324 |
| 3,313,301 | 4/1967 | Jefferts et al. | 128/330 |
| 3,545,405 | 12/1970 | Jefferts et al. | 119/3 |
| 3,820,545 | 6/1974 | Jefferts | 128/330 |
| 3,836,776 | 9/1974 | Gullekson | 250/312 |

*Primary Examiner*—Kyle L. Howell
*Attorney, Agent, or Firm*—Kenyon & Kenyon

[57] ABSTRACT

A metallic identifying tag for allowing later identification of a non-metallic object. The identifying tag is of a circular or oblong cross-section and has a plurality of spaced grooves cut along the surface thereof. In addition, holes may be provided through the center of the tag in conformance with a predetermined pattern which thus forms a profile readily identifiable by means of x-ray equipment. In this manner, while the tag remains implanted within the object it may be inspected and the coded pattern interpreted and the history of the object containing the tag thus ascertained.

7 Claims, 6 Drawing Figures

INTERNALLY READABLE IDENTIFYING TAG

RELATED APPLICATIONS

This application is a continuation-in-part of application Ser. No. 845,944 filed Oct. 27, 1977 now abandoned, which itself is a continuation of application Ser. No. 671,530, filed Mar. 29, 1976, now abandoned.

BACKGROUND OF THE INVENTION

This invention pertains generally to an apparatus which includes identifying indicia readily readable without removing it from the object sought to be identified.

In my earlier U.S. Pat. No. 3,545,405 issued on Dec. 8, 1970, there is described an apparatus for investigating the migratory habits of macro-organisms and more specifically one wherein the identifying tag contains along the surface thereof coded information. This coded information is in the form of a predetermined pattern which is imparted on the surface of the body by a high energy heat source such as by focusing laser pulses in a predetermined pattern on the surface of the body. Although this particular identifying tag has been highly successful in its usage, certain instances exist where a more desirable form of identifying tag might be utilized.

The identifying tag described in my earlier issued patent has been used extensively in conjunction with investigating the migratory habits of Pacific Coast salmon. When such an identifying tag is applied to investigating the migratory habits of Atlantic Coast salmon certain drawbacks have been encountered. For instance, in the case of the identifying tag described in my earlier patent, it has been necessary to excise the implanted tag before decoding could be accomplished. In other words, removal of the tag from the salmon is necessary in order to properly decode the information contained thereon. In the case of Atlantic Coast salmon, where generally only a limited quantity are recovered, this requires destruction and loss of the specimen which is disadvantageous. Also, there are certain other instances wherein a tag which could be read, i.e., the information thereon decoded, while still within the body of the object is advantageous and desirable. By the means disclosed herein, such a system is provided which allows for all the advantages of my previously disclosed system and yet which does not necessitate removal of the identifying tag in order to obtain the coded information imparted thereon.

SUMMARY OF THE INVENTION

Briefly stated, the invention disclosed herein includes an identifying tag which is adapted for implanting in a non-metallic object for the purpose of later identifying the object by means of x-ray equipment while the tag remains implanted within the object. The tag is in the form of a metallic elongated member having a circular or oblong cross-section and having a length significantly greater than the cross-sectional width thereof.

In the case of an oblong cross-section, the identifying tag has a plurality of grooves spaced from one another and cut into the outer surface of the tag so as to render the tag readable by means of x-ray equipment while implanted in a non-metallic object. In one preferred embodiment, the oblong cross-section has two opposite parallel surfaces contiguous at their edges with two outwardly curved surfaces. The base of the grooves are semicircularly shaped to form notches cut into the curved surfaces to a depth of one-quarter of the diameter of the notches. End notches which are cut deeper than the remaining notches provide an index defining the beginning of a code. In addition, holes can be cut through the parallel surfaces to increase the informational capacity of the tag. Optimal readability of the tag profile is obtained by viewing the tag transversely to the plane of the central spacing between the edges.

In the case of the circular cross-section, a plurality of cut grooves are spaced from one another and extend about the circumference of the cylindrical member such that in profile, each of the grooves is readily identifiable by means of x-ray equipment. In one embodiment, the grooves are rings having a diameter equal to one-half that of the circular cross-section and cut to a depth of one-quarter of the circular cross-sectional diameter.

In all cases, identification may be made while the tag remains implanted in the non-metallic object.

The tag is particularly suitable for implanting within the body of fish to aid in investigating their migratory habits. In the embodiment with an oblong cross-section having two parallel surfaces with their edges contiguous to outwardly curved surfaces, the tag has a cross-sectional maximum width of 0.016" and a minimum of 0.010" with the curved surfaces 0.008" distant from the longitudinal axis of the tag. The tag has an overall length of at least 0.045". Such a size and length has been found particularly suitable biologically for implanting within the body of the fish near the snout. The tag includes a plurality of cut notches spaced from one another, with the notch centerline to centerline distance being approximately 0.005" or about one-half the minimal cross-sectional length. The notches extend along the curved surfaces of the tag such that in profile, they are readily identifiable by means of x-ray equipment. Additionally, holes can be cut in the central spacing on the parallel surfaces.

The tag having a circular cross-section is of a size approximately 0.010" or larger in diameter and has a length of at least 0.040". Such a size and length has been found particularly suitable for implanting within the body of the fish. The tag includes a plurality of cut grooves spaced from one another, with the grooves being 0.005" in diameter and cut into the tag to a depth approximately equal to the radius of the groove. The grooves are spaced from one another and extend about the circumference of the cylindrical member such that in profile, they are readily identifiable by means of x-ray equipment.

Thus, the identifying tag of this invention includes a large amount of coded information so as to allow a large number of objects within which the tag is implanted to be identified. Moreover, the identification may readily be accomplished while the tag remains implanted within the object thus eliminating the necessity for excising the tag prior to decoding.

Accordingly, it is an object of this invention to provide an improved identifying tag which is adapted to be read while remaining implanted within the object.

Another object of this invention is to provide an improved identifying tag which may be implanted into the body of an organism under study and which may be decoded while remaining therein.

A further object of this invention is to provide an identifying tag which is suitable for usage in conjunction with identifying non-metallic objects and which may be read and decoded by means of x-ray equipment.

Yet a further object of this invention is to provide an identifying tag suitable for implantation in a known orientation without rotation thereby permitting coding in a known plane.

Yet a further object of this invention is to provide an identifying tag with increased informational capacity.

These and other objects, advantages and features of the invention will become more apparent from the following description of the preferred embodiment taken in conjunction with the accompanying drawings.

DESCRIPTION OF THE PREFERRED EMBODIMENT

With reference to the drawings, the identifying tag indicated generally at 10 and 20, which has circular and oblong cross-sections respectively, has its size dictated by the information density which may be successfully decoded with the x-ray technique. That density is such that in the case of fish, the use of three different lengths of tags in the system is preferred.

For tag 10 having a 0.010" or larger diameter such as 0.014" and made of stainless steel wire, lengths of 0.040", 0.060" and 0.080" are preferred to be used simultaneously in the system and have the following information capacities. The smallest size tag has the capacity for 64 different numbers, the intermediate length 1,024 different numbers and the longest 16,384.

Figure 1:
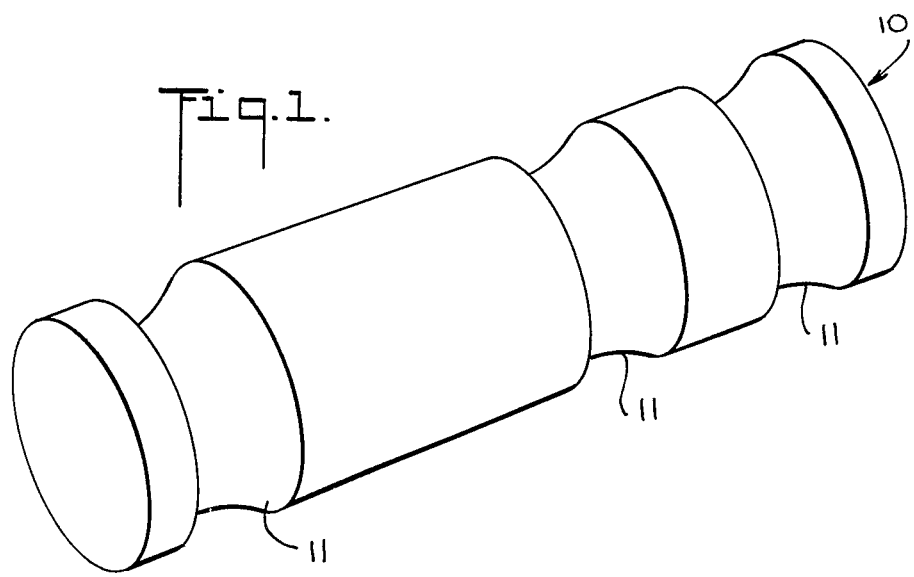
FIG. 1 is a perspective view of an identifying tag in conformance with this invention.

According to the present invention and as shown in FIG. 1, the information capacity is provided on the tag 10 by means of a plurality of grooves 11 spaced from one another. The spaced grooves 11 are in ring form having a 0.005" diameter and are preferably cut to a depth of 0.0025". The grooves spaced around the periphery of the identifying tag 10 are located at predetermined positions and allow for the interpreting of the presence or absence of a ring at a given position as a binary number, 1 or 0 respectively. The ring spacing chosen is half of the wire diameter, i.e., 0.005". Two positions are reserved for an index bar which defines the reading direction and starting point with the remaining positions available as the number. E.g., the 0.040" tag has 8 positions on its length, two reserved, six available for data. Since each position can have either of two values, ring or no ring, interpreted as 1 or 0, the data capacity is $2^6$ or 64 combinations. Similarly, for the tags having a greater length, the data capacity is increased as indicated previously.

Figure 4:
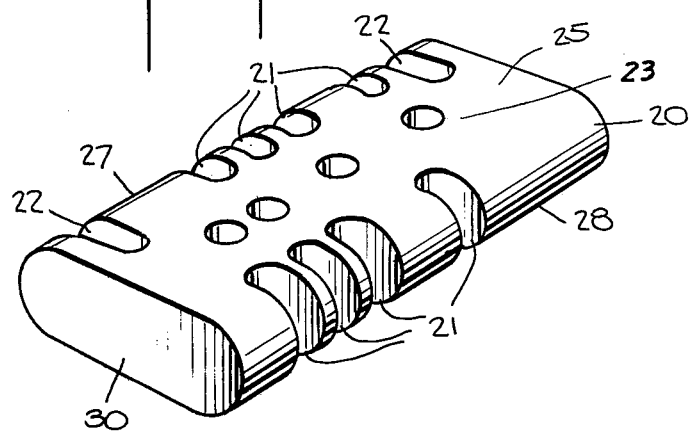
FIG. 4 is a perspective view of another embodiment of an identifying tag according to the present invention.
Figure 5:
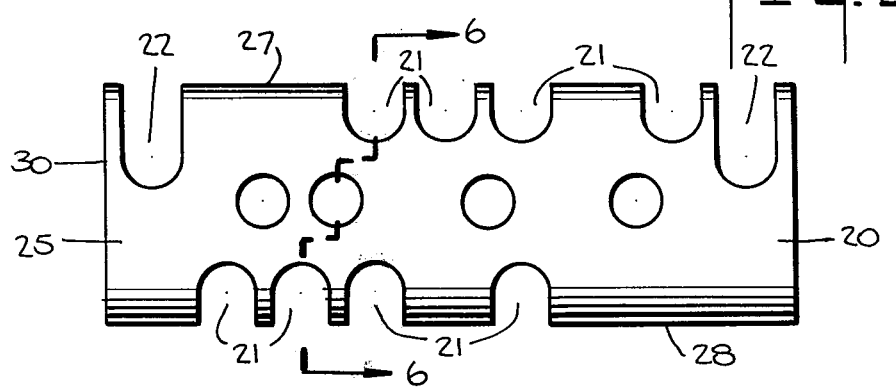
FIG. 5 is a top elevational view of the identifying tag of FIG. 4.
Figure 6:
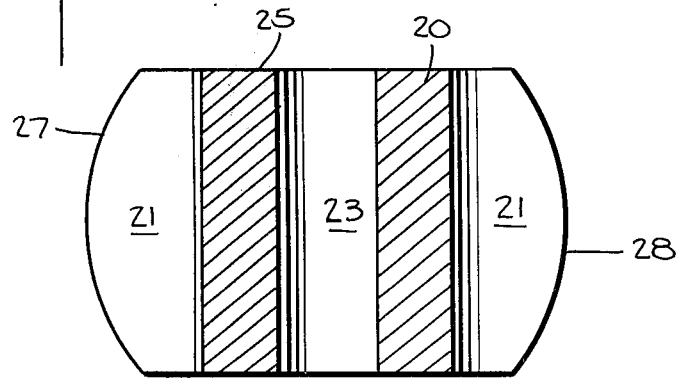
FIG. 6 is a cross-sectional view of the identifying tag of FIG. 4 taken along line 6—6 of FIG. 5.

The identifying tag 20 comprises a metallic elongated member having an oblong cross-section thereby resulting in curved surfaces 27, 28 and substantially flat parallel surfaces 25 and 26 as shown in FIGS. 4 and 6. Information grooves are provided in the form of notches 21 spaced and cut into each of the curved surfaces 27, 28, each surface thus being provided with different information coding. End notches 22 which are cut deeper into the curved surfaces 27, 28 than are the information notches 21 provide an index defining the code reading order. Perforations 23 can be cut through the surface spacing between the two rows of notches and thereby increase the information density. In order to maintain structural integrity, the holes 23 are cut off center from the central axis of the oppositely positioned notches 11 as shown in FIG. 5.

Information capacity is provided on the identifying tag 20 by means of the plurality of notches 21 spaced from one another. The notches 21 are arranged at predetermined positions and allow for the interpreting of the presence or absence of a notch 21 at a given position as binary number, 1 or 0 respectively, similarly to that for rings 11 for tag 10. In one preferred embodiment, shown in FIG. 5, space is provided for seven notches 21 along either curved surface 27, 28 as well as for two end notches 22. Six holes 23 may be positioned between the rows of notches 21. Since each position can have either of two values, notch or no notch (hole or no hole), interpreted as 1 or 0, the data capacity for either curved surface is $2^7$ or 128 while that for the holes 12 is $2^6$ or 64 combinations. Therefore, a tag 20 as shown in FIG. 5 has a total information capacity of $2^{20}$ or 1,048,576 codes.

In the case of use with fish, three lengths are preferred, all made of a stainless steel wire having an oblong cross-section with a smaller cross-sectional width of 0.010" and a larger cross-sectional width of 0.016". The curved surfaces are each 0.008", from the longitudinal axis of tag 20. Tags of lengths 0.045", 0.065" and 0.085" are preferred to be used simultaneously in the system and have information notch capacities respectively along a given edge of 7, 11 and 15. The latter two tag lengths provide proportionally increased data capacity by a factor of 4,096 and 16,777,216 respectively as compared to the data capacity for the smallest tag length. If a standard distance between successive central axes of notches 21 is taken as one-half the minimal cross-sectional width of the tag, then for a 0.010" width the notch axis separation distance becomes 0.005". Tags of even greater length will accommodate more notches 21 along a given curved surface 27, 28 and correspondingly more holes 23 in the tag central spacing thereby providing for greater information capacity.

The spaced notches 21 are preferably semicircular at least at the base portion although other shapes and geometry may be utilized to provide even further information storage capacity on the tag. For use in other animals, tags 10 and 20 are provided in various sizes dependent upon the biological suitability.

Grooves 11 and notches 21, 22 and holes 23 are preferably cut by means of rotary spark discharge machinery wherein the grooves 11 and notches 21, 22 are formed by spark erosion of the wire surface. Alternatively, the grooves 11, notches 21, 22 and holes 23 may be cut by means of a conventional diamond or carbide tool. The grooves 11, notches 21, 22 and holes 23 might also take a square or triangular shape which shape is such that it is readily identifiable when viewed in profile.

Figure 2:
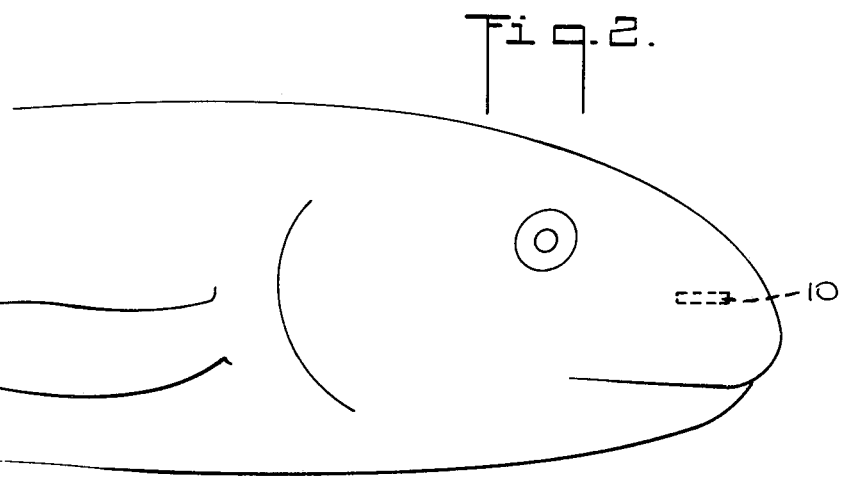
FIG. 2 is an elevational view of a fish having the identifying tag of this invention implanted therein.
Figure 3:
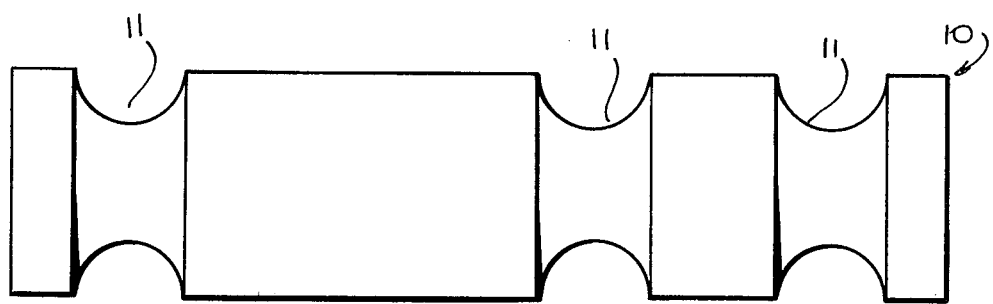
FIG. 3 is an elevational view of a first embodiment of the identifying tag of FIG. 1 illustrating its shape in profile.

Once the tag is coded in accordance with the predetermined relationship, it is implanted into the snout or head portion of the salmon. This is illustrated in FIG. 2. Successful implantation of this nature might be best accomplished by employing the implanting machine disclosed in my earlier U.S. Pat. No. 3,820,545 issued on June 28, 1974. The identifying tags 10 and 20 are preferably fabricated of type 302 stainless steel. This material has been found to have the requisite magnetic characteristics for detection so as to make a preliminary determination that the recovered animal has an implanted identifying tag. Subsequently when the animal has been recovered and it being determined as having an identifying tag 10 or 20 implanted therein, a portable x-ray unit may be employed and the identifying tag may be viewed while remaining within the body of the animal. In profile, the identifying tag will appear as depicted in FIG. 2 in the case of fish and the particular grouping of grooves 11 or notches 21, 22 and holes 23 may be readily ascertained and the history of the fish and its migratory habits may then be determined.

By way of example, consider the tag of FIG. 5 as implanted in the snout of a fish depicted in FIG. 2. Assuming that face 30 is inserted into the snout and that by convention the code will read starting at the face farthest into the fish, here face 30, and beginning with the notches bounded between the end notches 22, in such instance the code would read as 0011101, 110101 for the holes 23, and finally 1110100 for the notches 21 extending along curved surface 28 and not bounded by end notches 22.

Both the circular and oblong cross-section of tags 10 and 20 respectively have definite functional advantages. Reading of the tag 10 within a fish, or animal is possible without regard to orientation of tag 10. However, tag 20 with an oblong cross-section provides for fixed orientation upon implantation, and therefore fish or animals can then be examined under a given orientation with assurance that a complete code will be read.

In addition to the utility of this invention in conjunction with macro-organisms as described, it has also been found that numerous problems exist in other areas where such identifying tags might also be used to advantage. For instance, a manufacturer of wood products has a need to determine whether or not a certain product is one of its own at some later date. Frequently, the question arises many years later as to the identity of the manufacturer of a certain component utilized in the structure of a building. Under some present practices, manufacturers of laminated beams inscribe identifying marks on the ends of the beam or elsewhere for the purposes of latter identification. However, such a system has proven inadequate in that the ends are frequently cut off or destroyed during construction. Even when this does not occur, these identifying marks generally cannot be located and read without at least partially dismantling the structure and removing the particular beam in question. Identification in such instances might however, be made without these prior art difficulties by utilizing the means disclosed herein.

By following the teachings disclosed herein, under such circumstances, the tags are fabricated in a slightly larger size than those heretofore described and include notches and perforations shaped and formed generally in the same manner previously described. For a laminated wooden beam, such identifying tag is preferably in the form of a short nail which is ultimately nailed and thus embedded into the beam, and if necessary the wooden beams can later be identified by means of the coded tag or nail embedded therein. Preferably, the nail is of a size of approximately 0.125" in maximum diameter and approximately 1.5 to 2.0 inches long. The grooves 11, notches 21, 22 and holes 23 are cut and located in the manner previously described to thus incorporate the coded information onto the nail. For this size nail, the grooves 11 or notches 21, 22 and holes 23 are preferably a 0.025" semicircle or square. The nail type tag may then be embedded in the laminated beam by nailing in the conventional manner generally at a predetermined location, for instance, one-third the distance from the end of the beam, in a predetermined orientation. Thereafter, when it becomes necessary to identify the beam, the decoding takes place while the nail or tag remains within the beam by utilizing a portable x-ray machine. Thus, the utility of this invention encompasses numerous non-metallic objects into which the tag or nail might be embedded without causing destruction of the particular object. It is therefore readily seen, that by utilizing the identifying tag as disclosed herein, products might later be identified simply by subjecting them to an x-ray viewing and then decoding the particular information on the identifying tag or nail contained therein.

Other modifications, variations of the invention as hereinbefore set forth may be made without departing from the spirit and scope thereof, and therefore, only such limitations should be imposed as are indicated in the appended claims.

What is claimed is:

1. An identifying tag for implanting in small animals including fish to aid in determining the movement thereof from one habitat to another and which is identifiable by means of X-ray equipment, which comprises a solid one piece generally uniformly shaped metallic elongated member being of a length sufficiently small so as to render said member suitable for implantation into an animal, said metallic member having a substantially oblong cross-sectional shape to facilitate orientation of said tag when implanted in said animal and a longitudinal length significantly greater than the maximum cross-sectional width thereof suitable for maintaining sufficient data storage capacity on said tag, said metallic elongated member having cut in its outer surface a plurality of spaced grooves at least some of which extend only partially about the non-circular peripheral surface of said elongated member to form a predetermined fixed format binary coding system which includes an indexing means to define the reading direction of the coded grooves, said grooves being of a sufficient depth such that in profile each of said grooves is readily identifiable as being transparent as distinguished from opaque by means of X-ray equipment while said tag remains implanted in said animal.

2. An identifying tag in accordance with claim 1 wherein the base portion of each of said plurality of grooves being of a substantially semi-circular shape and having at the surface of said metallic elongated member a width of approximately one-half the smaller cross-sectional width of said metallic elongated member.

3. An identifying tag in accordance with claim 1 wherein said metallic elongated member further has a plurality of perforations extending through the surface of said metallic elongated member.

4. An identifying tag in accordance with claim 3 wherein said perforations are of a substantially circular shape.

5. An identifying tag in accordance with claim 1 wherein said substantially oblong cross-section includes at least two pair of opposed surfaces which comprise one pair of opposed flat substantially parallel surfaces and another pair of opposed surfaces outwardly curved with a common radius of curvature determined from the longitudinal axis of said metallic elongated member.

6. An identifying tag in accordance with claim 1 wherein said metallic elongated member is composed of a material which is capable of being magnetized.

7. An identifying tag in accordance with claim 1 wherein said plurality of grooves further includes at least one groove disposed adjacent the end of said elongated member cut into said metallic elongated member to a depth greater than the depth of said remaining grooves so as to provide an index to define the reading direction of the coded grooves.

* * * * *

UNITED STATES PATENT AND TRADEMARK OFFICE
CERTIFICATE OF CORRECTION

PATENT NO. : 4,233,964
DATED : November 18, 1980
INVENTOR(S) : Keith B. Jefferts and Elaine R. Jefferts It is certified that error appears in the above—identified patent and that said Letters Patent is hereby corrected as shown below:

Please change the names of the Inventors from

"Keith B. Jefferts and Elaine R. Jefferts"

to --Keith B. Jefferts and Elaine Ryan--.

Signed and Sealed this

Tenth Day of March 1981

[SEAL]

Attest:

RENE D. TEGTMEYER

*Attesting Officer*     *Acting Commissioner of Patents and Trademarks*